United States Patent
Sui et al.

(10) Patent No.: US 9,893,771 B2
(45) Date of Patent: Feb. 13, 2018

(54) WIRELESS CHARGER USING FREQUENCY ALIASING FSK DEMODULATION

(71) Applicant: FREESCALE SEMICONDUCTOR, INC., Austin, TX (US)

(72) Inventors: Zhiling Sui, Suzhou (CN); Zhijun Chen, Suzhou (CN); Zhihong Cheng, Suzhou (CN); SHixiang Nie, Suzhou (CN)

(73) Assignee: NXP USA, INC., Austin, TX (US)

( * ) Notice: Subject to any disclaimer, the term of this patent is extended or adjusted under 35 U.S.C. 154(b) by 0 days.

(21) Appl. No.: 15/235,081

(22) Filed: Aug. 11, 2016

(65) Prior Publication Data

US 2017/0070265 A1 Mar. 9, 2017

(30) Foreign Application Priority Data

Sep. 8, 2015 (CN) .......................... 2015 1 0674052

(51) Int. Cl.
*H04L 27/148* (2006.01)
*H04B 5/00* (2006.01)

(52) U.S. Cl.
CPC ......... *H04B 5/0075* (2013.01); *H04B 5/0031* (2013.01); *H04B 5/0037* (2013.01); *H04L 27/148* (2013.01)

(58) Field of Classification Search
None
See application file for complete search history.

(56) References Cited

U.S. PATENT DOCUMENTS

| | | | |
|---|---|---|---|
| 4,813,058 A | 3/1989 | Takase | |
| 5,550,505 A | 8/1996 | Gaus | |
| 9,225,568 B1 * | 12/2015 | Mei | .................. H04L 27/1563 |
| 2007/0147544 A1 | 6/2007 | Akahori | |
| 2008/0169872 A1 | 7/2008 | Ghovanloo | |
| 2011/0129034 A1 | 6/2011 | Akahori | |

* cited by examiner

*Primary Examiner* — David Bilodeau
(74) *Attorney, Agent, or Firm* — Charles E. Bergere

(57) ABSTRACT

A frequency shift keying (FSK) demodulation component having of a sampler that receives an FSK modulated signal, samples the received FSK modulated signal, and outputs the sampled signal. The FSK demodulation component further includes a low pass filter that filters the sampled signal, and a frequency shift detector that detects shifts in frequency of the low pass filtered sampled signal. The FSK demodulation component then outputs an indication of the detection of shifts in frequency of the low pass filtered sampled signal.

10 Claims, 4 Drawing Sheets

# WIRELESS CHARGER USING FREQUENCY ALIASING FSK DEMODULATION

BACKGROUND

The present invention relates generally to wireless charging and, more particularly, to a wireless charger using frequency aliasing FSK (Frequency Shift Keying) demodulation.

Frequency shift keying is a frequency modulation scheme in which digital information can be transmitted by discrete changes of a carrier wave frequency. A simple form of FSK is binary frequency shift keying (BFSK) where a logical "1" is represented by a first frequency ($f_{OP}$) of a carrier wave and a logical "0" is represented by a second frequency ($f_{MOD}$) of the carrier wave.

One known method for de-modulating BFSK signals uses a comparator to resolve the incoming modulated waveform into a square wave by comparing the received signal amplitude with a threshold. A counter/timer circuit monitors the frequency of state transactions of the square waves in order to determine a count of transitions per time period. In an alternative method, the counter/timer circuit measures how long it takes to complete a pre-defined number of transitions. A decision device then selects a frequency from a predetermined set of frequencies that most closely corresponds to the measurement, and decodes a bit value '0' or '1' corresponding to the selected frequency.

This de-modulation method works satisfactorily when there is an appreciable difference between the modulation frequencies ($f_{OP}$) and ($f_{MOD}$). However, when the difference ($f_{OP}$-$f_{MOD}$) between the modulation frequencies ($f_{OP}$) and ($f_{MOD}$) represents a small fraction (e.g., <1%) of the modulation frequencies ($f_{OP}$) and ($f_{MOD}$), detecting such a relatively small frequency shift between the two frequencies ($f_{OP}$) and ($f_{MOD}$) is difficult to achieve.

The Wireless Power Consortium WPC-QI standard employs a FSK modulation/demodulation implementation in which modulation frequencies of, for example, $f_{OP}$=100 kHz and $f_{MOD}$=100.3 kHz are used. As such, the difference between the modulation frequencies ($f_{OP}$ and $f_{MOD}$) is 0.3 kHz, representing just 0.3% of the modulation frequencies ($f_{OP}$ and $f_{MOD}$).

In a conventional counter/timer-based FSK demodulation circuit, in order to detect such a small frequency shift, an accurate high-speed clock signal is required, which in low cost applications can be prohibitively expensive to implement. For example, in order to detect a 0.3 kHz frequency shift between modulation frequencies of $f_{OP}$=100 kHz and $f_{MOD}$=100.3 kHz, such as that defined by the WPC-QI standard, using the conventional circuitry described above would require a counter/timer clock running at around 128 MHz. Furthermore, circuits operating at such high frequencies consume significantly more power than lower frequency circuits. As such, implementing such a high frequency clock signal can have a significant detrimental effect on the power efficiency of a device.

Thus it would be advantageous to provide a method and apparatus for performing FSK demodulation that alleviates the need for a high-speed clock signal in order to detect small frequency shifts that represent a small fraction of the fundamental modulation frequencies.

BRIEF DESCRIPTION OF THE DRAWINGS

The invention, together with objects and advantages thereof, may best be understood by reference to the following description of preferred embodiments together with the accompanying drawings in which.

DETAILED DESCRIPTION OF PREFERRED EMBODIMENTS

Figure 1:
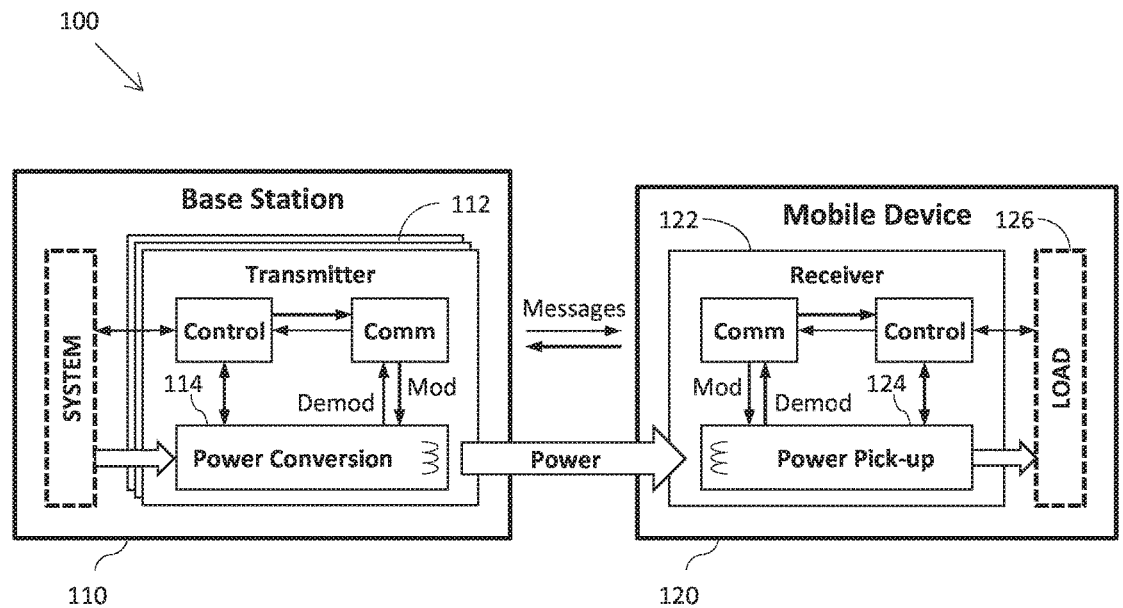
FIG. 1 is a simplified block diagram of an application using frequency shift keying (FSK) modulation.

The detailed description set forth below in connection with the appended drawings is intended as a description of presently preferred embodiments of the invention, and is not intended to represent the only forms in which the present invention may be practised. It is to be understood that the same or equivalent functions may be accomplished by different embodiments that are intended to be encompassed within the spirit and scope of the invention. In the drawings, like numerals are used to indicate like elements throughout. Furthermore, terms "comprises," "comprising," or any other variation thereof, are intended to cover a non-exclusive inclusion, such that module, circuit, device components, structures and method steps that comprises a list of elements or steps does not include only those elements but may include other elements or steps not expressly listed or inherent to such module, circuit, device components or steps. An element or step proceeded by "comprises . . . a" does not, without more constraints, preclude the existence of additional identical elements or steps that comprises the element or step.

In one embodiment, the present invention provides a frequency shift keying (FSK) demodulator. The FSK demodulator comprises a sampler arranged to receive an FSK modulated signal, sample the received FSK modulated signal and output the sampled signal. The FSK demodulator further comprises a filter arranged to apply low pass filtering to the sampled signal output by the sampler, and a frequency shift detector arranged to detect shifts in frequency of the low-pass-filtered sampled signal, and to output an indication of the detection of shifts in frequency of the filtered sampled signal.

In another embodiment, the present invention provides an integrated circuit device including such an FSK demodulation component.

In another embodiment, the present invention provides a method of performing FSK demodulation. The method comprises receiving an FSK modulated signal, sampling the received FSK modulated signal, applying low-pass-filtering to the sampled signal, detecting shifts in frequency of the low-pass-filtered sampled signal, and outputting an indication of the detection of shifts in frequency of the low-pass-filtered sampled signal.

Advantageously, and as described in greater detail below, by sampling and then low-pass filtering the FSK modulated signal, the frequency shift detection may be performed on lower frequency alias counterpart frequency signals. As such, the relative frequency shift required to be detected between the lower frequency alias counterpart frequency signals can be formed to be greater and easier to detect than between the original higher frequency FSK components. As such, the design requirements on the frequency shift detector may be significantly reduced.

Referring now to FIG. 1, a simplified block diagram of an example of an application using frequency shift keying (FSK) modulation is shown. In particular, a simplified block diagram of an example of a wireless power transfer system 100 adapted in accordance with the Wireless Power Consortium WPC-QI standard, and employing FSK modulation/demodulation to enable wireless communication between devices is illustrated.

The wireless power transfer system illustrated in FIG. 1 comprises a base station 110 and one or more mobile devices 120. The base station 110 comprises one or more transmitters 112. Each transmitter 112 comprises a power conversion unit 114 arranged to convert electrical power into a wireless radio frequency (RF) power signal. The mobile device 120 comprises a receiver 122. The receiver 122 within the mobile device 120 comprises a power pick-up unit 124 arranged to convert the wireless RF power signal generated by a transmitter 112 of the base station 110 and convert it into electrical power which is then provided to a load 126 of the mobile device 120.

In addition to the transfer of power from the base station 110 to the mobile device 120, the transmitter 112 is able to send messages to the receiver 122 through binary frequency shift keying (BFSK) modulation of the wireless RF power signal, where a logical "1" is represented by a first frequency ($f_{OP}$) of a carrier wave of the wireless RF power signal and a logical "0" is represented by a second frequency ($f_{MOD}$) of the carrier wave of the wireless RF power signal. The receiver 122 is correspondingly arranged to perform FSK demodulation on the received RF power signal to retrieve messages sent by the transmitter 112.

Figure 2:
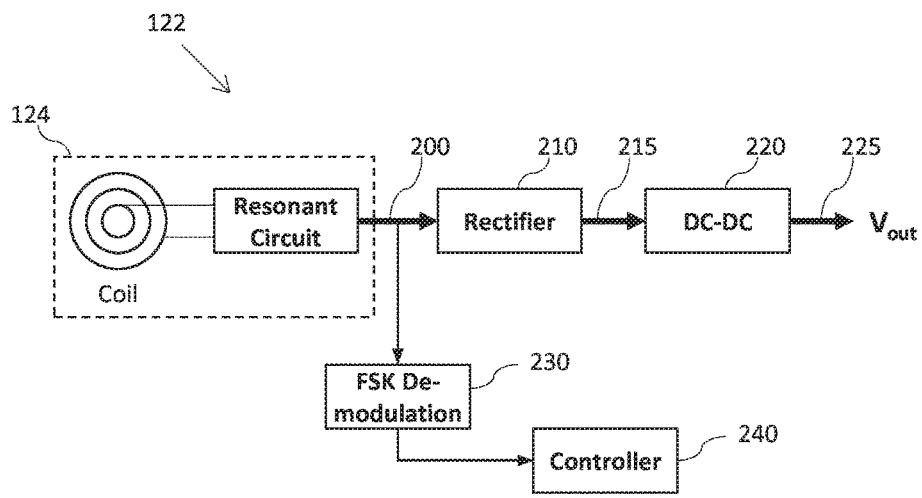
FIG. 2 is a simplified block diagram of the receiver within the mobile device of FIG. 1.

FIG. 2 is a simplified block diagram of a receiver 122 within the mobile device 120 of FIG. 1, in accordance with an embodiment of the present invention. The power pick-up unit 124 comprises a coil and resonant circuit, and converts the wireless RF power signal from the transmitter 112 into an RF electrical signal 200, which is provided to a rectifier 210. The rectifier 210 converts the RF electrical signal 200 into an unregulated DC (direct current) signal 215. A DC to DC converter then converts the unregulated DC signal 215 into a regulated DC signal 225 that is output to the load 126 of the mobile device 120. The receiver 122 further comprises an FSK demodulation component 230 arranged to receive the RF electrical signal 200 output by the power pick-up unit 124, and to perform FSK demodulation of the RF electrical signal 200 to recover data transmitted over the wireless RF power signal by the transmitter 112. The data recovered through FSK demodulation of the RF electrical signal 200 is then passed on to a controller 240 of the receiver 122.

Figure 3:
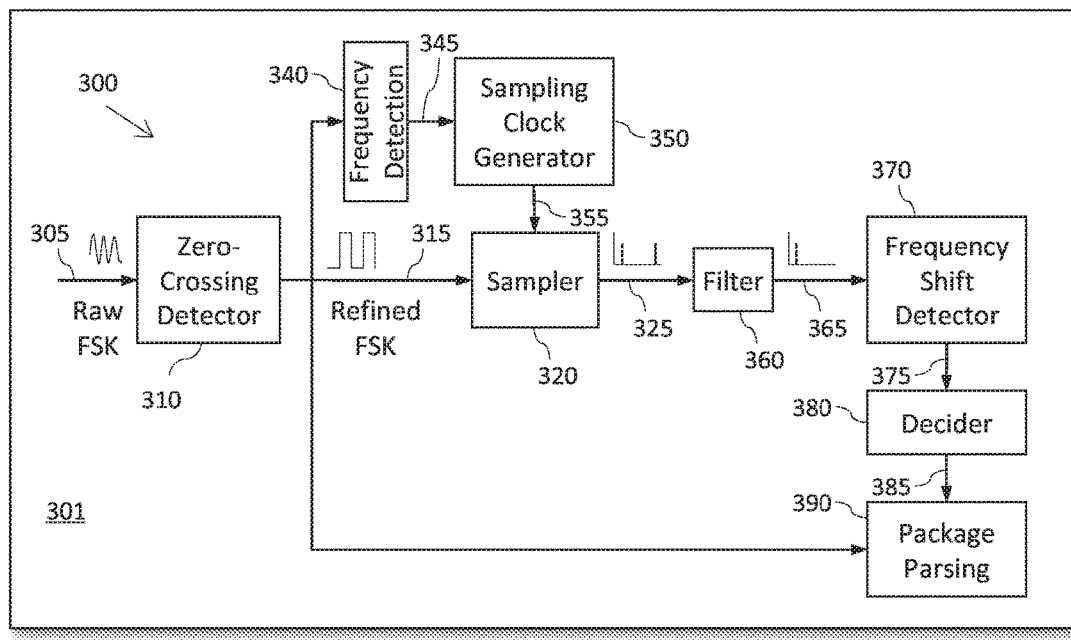
FIG. 3 is a simplified block diagram of an FSK demodulation component in accordance with an embodiment of the present invention.

FIG. 3 is a simplified block diagram of an embodiment of an FSK demodulator 300 in accordance with the present invention, such as may be used to implement the FSK demodulation component 230 of the receiver 122 illustrated in FIG. 2. In the illustrated embodiment, the FSK demodulator 300 is implemented within an integrated circuit device, illustrated generally at 301. The FSK demodulator 300 receives a raw FSK signal 305 to be demodulated, such as the RF electrical signal 200 output by the power pick-up unit 124 in FIG. 2, perform demodulation of the received FSK signal 305, and recover data modulated therein.

The voltage amplitude of the raw, unrefined FSK signal 305 may be unregulated, and as such may experience potentially damaging voltage levels. Accordingly, in the example in FIG. 3, the FSK demodulator 300 comprises a square wave generator 310, which in the illustrated example comprises a zero-crossing detector, arranged to receive the raw FSK signal 305 to be demodulated and convert the received raw FSK signal 305 into a refined FSK modulated square wave signal 315 having regulated voltage levels.

In some examples, the raw FSK signal 305 may be passed through a voltage divider circuit (not shown) to reduce the voltage levels of the raw FSK signal 305 before being received by the square wave generator 310.

In addition, the raw FSK signal 305 may comprise high noise levels. Accordingly, is some examples the raw FSK signal 305 may be passed through a filter (not shown) before being received by the square wave generator 310 to remove (at least some of) the noise present within the raw FSK signal 305.

The FSK demodulator 300 further comprises a sampler 320. The sampler 320 receives the refined FSK modulated signal 315 output by the square wave generator 310, and samples the received refined FSK modulated signal 315 at a rate defined by a sampling clock signal 355. The sampler 320 outputs the sampled signal 325. In some embodiments, the sampler 320 may be implemented by way of a D-type flip-flop or similar device.

Figure 4:
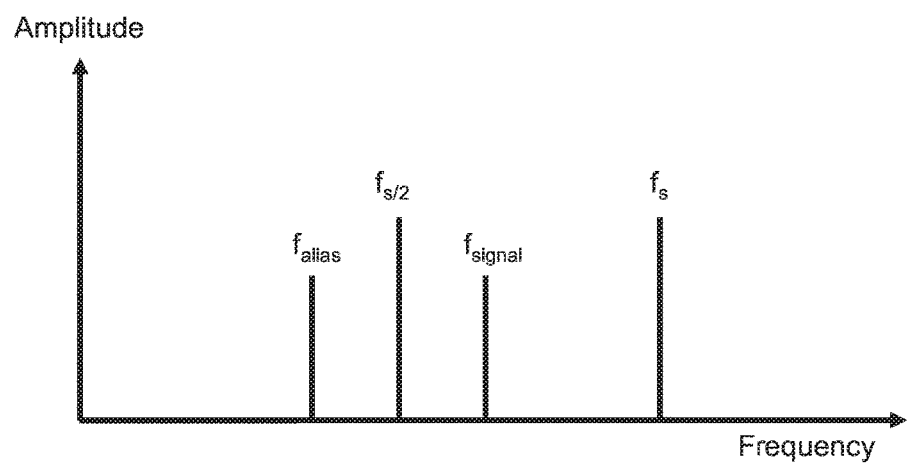
FIG. 4 is a graph of amplitude over frequency showing the concept of aliasing.

Aliasing is a term used in the field of digital signal processing to refer to an effect that occurs when sampling an analogue signal. When an analog signal is sampled, any component of the signal being sampled that is above one-half the sampling frequency (Nyquist frequency) will be 'aliased', i.e., mirrored about one-half the sampling frequency. FIG. 4 illustrates a simplified graph of amplitude over frequency showing the concept of aliasing when a signal having a frequency $f_{signal}$ is sampled at a sampling frequency $f_s$. As illustrated in FIG. 4, an alias signal is created having a frequency $f_{alias}$ that is the 'mirror' of the frequency $f_{signal}$ of the original signal with respect to one-half the sampling frequency $f_{s/2}$. As such, the alias signal frequency $f_{alias}$ is equal to the sampling frequency $f_s$ minus the frequency $f_{signal}$ of the original signal such that:

$$f_{alias}=f_s-f_{signal}$$

Referring back to FIG. 3, as a result of the effect of aliasing, if the sampling clock signal 355 has a clock rate such that the sampler 320 samples the refined FSK modulated signal 315 at a rate less than twice the frequency of the refined FSK modulated signal 315, the sampled signal 325 output by the sampler 320 will comprise a frequency component $f_{FSK}$ corresponding to the frequency of the received refined FSK modulated signal 315 and at least one alias frequency component $f_{alias}$. The alias frequency component $f_{alias}$ will have a frequency equal to the sampling frequency $f_s$ (defined by the sampling clock signal 355) minus the frequency of the FSK frequency component $f_{FSK}$ such that:

$$f_{alias}=f_s-f_{FSK}$$

The FSK demodulator 300 further comprises a filter 360 that applies low pass filtering to the sampled signal 325 output by the sampler 320. The low pass filtered sampled signal 365 is provided to a frequency shift detector 370 that detects shifts in frequency of the low pass filtered sampled signal 365, and outputs an indication 375 of the detection of shifts in frequency of the low pass filtered sampled signal 365. In the illustrated example, the indication 375 of the detection of shifts in frequency of the filtered signal 365 is provided to a frequency shift decider 380. The frequency shift decider 380 accumulates a plurality of consecutive indication values 375 output by the frequency shift detector 370 over a period of time, and decides when a frequency shift occurs based on the accumulated plurality of indication values 375. The frequency shift decider 380 then outputs a frequency shift decision 385 to a package parsing component 390.

As identified in the background, when the difference ($f_{OP}$-$f_{MOD}$) between the modulation frequencies ($f_P$) and ($f_{MOD}$) represents a small fraction (e.g., <1%) of the modulation frequencies ($f_{OP}$) and ($f_{MOD}$), detecting such a relatively small frequency shift between the two frequencies ($f_{OP}$) and ($f_{MOD}$) is difficult to achieve.

Advantageously, by sampling the received refined FSK modulated signal 315, an alias signal is created having a frequency:

$$f_{alias} = f_s - f_{FSK}$$

By providing an appropriate sampling clock signal 355 to the sampler 320 (such that the sampler 320 samples the refined FSK modulated signal 315 at a rate less than twice the FSK modulation frequency $f_{FSK}$), the sampled signal 325 can be arranged to comprise an alias frequency component having a lower frequency $f_{alias}$ than that of the FSK modulation component $f_{FSK}$.

Figure 5:
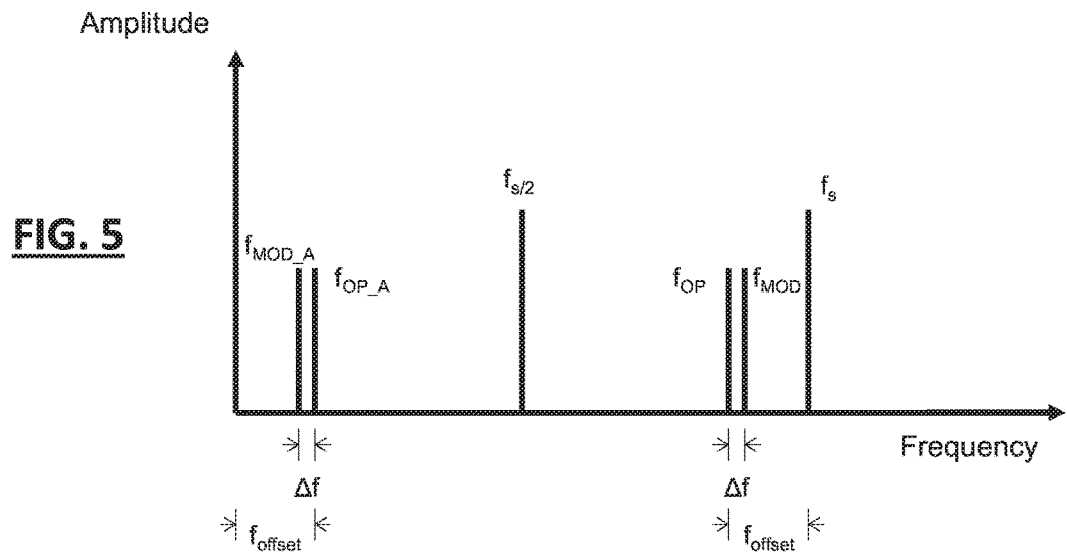
FIG. 5 is a graph of amplitude over frequency showing the original FSK modulation frequencies and the corresponding alias frequencies.

Accordingly, and as illustrated in FIG. 5, within the resulting sampled signal 325, the alias frequencies ($f_{OP\_A}$) and ($f_{MOD\_A}$) of the first and second modulation frequencies ($f_{OP}$) and ($f_{MOD}$) will maintain the same frequency spacing ($\Delta f$) as the original modulation frequencies, but will have lower actual frequencies. As a result, the relative frequency shift will be greater for the alias frequencies ($f_{OP\_A}$) and ($f_{MOD\_A}$) than for the original FSK frequencies ($f_{OP}$) and ($f_{MOD}$). Thus, detecting a frequency shift between the alias frequencies ($f_{OP\_A}$) and ($f_{MOD\_A}$) will be easier than detecting a corresponding frequency shift between the original FSK frequencies ($f_{OP}$) and ($f_{MOD}$).

Referring back to FIG. 3, by implementing the low pass filter 360 between the sampler 320 and the frequency shift detector 370, the higher frequency FSK components $f_{OP}$ and $f_{MOD}$ can be filtered out from the low pass filtered sampled signal 365. In this manner, the low pass filtered sampled signal 365 received by the frequency shift detector 370 comprises the lower frequency alias components $f_{OP\_A}$ and $f_{MOD\_A}$. As such, the relative frequency shift required to be detected by the frequency shift detector 370 between the lower frequency alias components $f_{OP\_A}$ and $f_{MOD\_A}$ is significantly greater and easier to detect than between the original higher frequency FSK components $f_{OP}$ and $f_{MOD}$. As such, the design requirements on the frequency shift detector 370 may be significantly reduced.

For example, in a Wireless Power Consortium WPC-QI application, such as illustrated in FIG. 1, FSK modulation frequencies are required to be in the range of 110 kHz~200 kHz, for example $f_{OP}$=100 kHz and $f_{MOD}$=100.3 kHz may be used. As such, the frequency spacing ($\Delta f$) between the modulation frequencies ($f_{OP}$) and ($f_{MOD}$) is 0.3 kHz, representing just 0.3% of the modulation frequencies ($f_{OP}$) and ($f_{MOD}$). If the sampling clock signal 355 is configured such that the sampler 320 samples the refined FSK modulated signal 315 at a rate of, for example, 101 kHz, alias signals for the modulation frequencies ($f_{OP}$) and ($f_{MOD}$) would be created at 1 kHz and 0.7 kHz respectively. Notably, the alias frequency components ($f_{OP\_A}$) and ($f_{MOD\_A}$) retain the 0.3 kHz frequency spacing ($\Delta f$) of the original FSK modulation frequencies ($f_{OP}$) and ($f_{MOD}$). However, such a frequency spacing ($\Delta f$) constitutes a significantly larger proportion of the alias frequency components ($f_{OP\_A}$) and ($f_{MOD\_A}$), in the region of 30%, as compared with the original FSK modulation frequencies ($f_{OP}$) and ($f_{MOD}$), for which it is just 0.3%. As such, detecting a frequency shift between the alias frequency components ($f_{OP\_A}$) and ($f_{MOD\_A}$) is significantly easier than between the original FSK modulation frequencies ($f_{OP}$) and ($f_{MOD}$).

Figure 6:
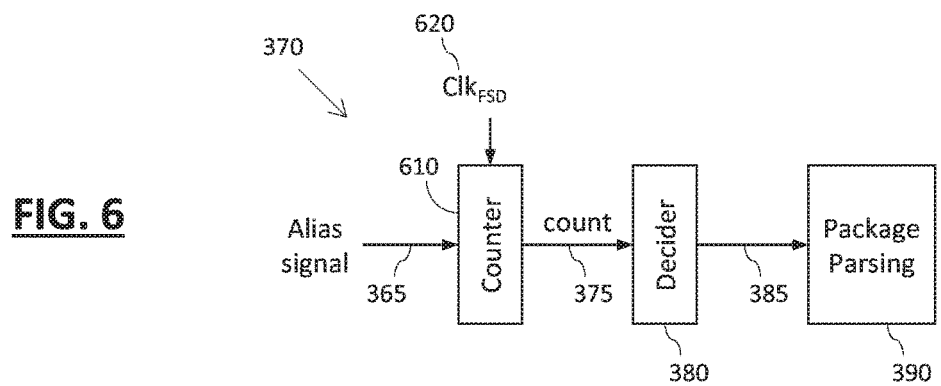
FIG. 6 is a simplified block diagram of a frequency shift detector in accordance with an embodiment of the present invention.

FIG. 6 is a simplified block diagram of the frequency shift detector 370 in accordance with an embodiment of the present invention. In this embodiment, the frequency shift detector 370 comprises a counter 610. The counter 610 receives the low-pass-filtered sampled signal 365, which as described above comprises the lower frequency alias components $f_{OP\_A}$ and $f_{MOD\_A}$. More specifically, the low-pass-filtered sampled signal 365 will comprise one of the lower frequency alias components $f_{OP\_A}$ and $f_{MOD\_A}$ at any point in time. The counter 610 receives a clock signal $Clk_{FSD}$ 620, and counts the number of clock cycles of the clock signal $Clk_{FSD}$ 620 within, for example, a single cycle of the low-pass-filtered sampled signal 365, and outputs the count value as the indication 375 of the detection of shifts in frequency of the low-pass-filtered signal 365 to the frequency shift decider 380. The frequency shift decider 380 decides when a frequency shift occurs based on an accumulated plurality of indication values 375 provided by the counter 610 over a period of time, and outputs a frequency shift decision 385 to the package parsing component 390.

Significantly, in the Wireless Power Consortium WPC-QI example above consisting of the original FSK modulation frequencies of $f_{OP}$=100 kHz and $f_{MOD}$=100.3 kHz, and a frequency spacing ($\Delta f$) of 0.3 kHz, to detect the 0.3 kHz frequency shift between the original FSK modulation frequencies ($f_{OP}$) and ($f_{MOD}$) of 100 kHz and 100.3 KHz would require a high speed clock signal $Clk_{FSD}$ 620 having a frequency of greater than 20 MHz (using group period demodulation). By contrast, to detect the 0.3 kHz frequency shift between the alias frequency ($f_{OP\_A}$) and ($f_{MOD\_A}$) of 1 kHz and 0.7 kHz, only requires a clock signal $Clk_{FSD}$ 620 having a frequency greater than just 20 kHz (1,000 times slower). Thus, by using the alias signals to detect the frequency shift within the FSK modulated signal in this manner, a high-speed counter clock signal is not required within the frequency shift detection circuitry.

Advantageously, enabling a significantly lower-speed counter clock signal to be used to within the frequency shift detection circuitry significantly reduces the power consumption of the frequency shift detection circuitry.

It will be appreciated that the present invention is not limited to the frequency shift detector 370 being implemented by way of a counter, and that any suitable alternative circuit arrangement for detecting a frequency shift within the low-pass-filtered sampled signal 365 may equally be implemented. One example of such an alternative implementation of the frequency shift detector 370 comprises a timer circuit arranged to measure a number of cycles of the low pass filtered sampled signal 365 that occur within a given time period.

Referring back to FIG. 3, in some embodiments the FSK demodulator 300 may comprise a clock generator 350 for generating the sampling clock signal 355. In the illustrated example, the clock generator 350 is arranged to receive an indication 345 of a modulation frequency $f_{FSK}$ of the refined FSK modulated signal 315, and to configure the sampling clock signal 355 to cause the sampler 320 to sample the refined FSK modulated signal 315 at a frequency $f_s$ offset from the modulation frequency $f_{FSK}$ by a defined frequency offset ($f_{offset}$), whereby the defined frequency offset ($f_{offset}$) comprises a frequency within the frequency range passed by the filter 360. In this manner, the sampling of the refined FSK modulated signal 315, having a modulation frequency $f_{FSK}$, will generate an alias signal at a frequency equal to the defined frequency offset ($f_{offset}$) which will be passed by the filter 360.

In the Wireless Power Consortium WPC-QI example above including the original FSK modulation frequencies of $f_{OP}$=100 kHz and $f_{MOD}$=100.3 kHz, and a frequency spacing ($\Delta f$) of 0.3 kHz, the clock generator 350 is arranged to receive an indication 345 of, say, the FSK modulation frequency ($f_{OP}$), and to configure the sampling clock signal 355 to cause the sampler 320 to sample the refined FSK modulated signal 315 at a frequency $f_s$ offset from the modulation frequency ($f_{OP}$) by a defined frequency offset ($f_{offset}$) of, in the above example, 1 kHz.

In this manner, and as illustrated generally in FIG. 5, when the refined FSK modulated signal 315 comprises the FSK modulation frequency ($f_{OP}$) of 100 kHz, the sampling of the refined FSK modulated signal 315 will generate an alias signal at a frequency of 1 kHz (based on ($f_{alias}$=$f_s$−$f_{FSK}$). Conversely, when the refined FSK modulated signal 315 comprises the FSK modulation frequency ($f_{MOD}$) of 100.3 kHz, the sampling of the refined FSK modulated signal 315 will generate an alias signal at a frequency of 0.7 kHz.

The defined frequency offset ($f_{offset}$) may equally be a negative offset. For example, the clock generator 350 may configure the sampling clock signal 355 to cause the sampler 320 to sample the refined FSK modulated signal 315 at a frequency $f_s$ offset from the modulation frequency ($f_{OP}$) by, for example, −1 kHz; i.e. $f_s$=100 kHz−1 kHz=99 kHz. Such a sampling frequency would result in alias frequency components within the sample signal of 1 kHz ($f_{OP\_A}$) and 1.3 kHz ($F_{MOD\_A}$).

In the embodiment illustrated in FIG. 3, the FSK demodulator 300 further comprises a frequency detector 340 that receives the refined FSK modulated signal 315, detects the modulation frequency $f_{FSK}$ of the refined FSK modulated signal 315, and outputs the indication 345 of the detected modulation frequency $f_{FSK}$ to the clock generator 350.

Advantageously, by detecting the frequency of the FSK modulated signal 315 in this manner, and then configuring the sampling clock signal 355 based on the detected frequency of the FSK modulated signal 315, the sampling rate of the sampler 320 can be adapted based on the frequency of the FSK modulated signal 315 in order to generate alias signals within the sampled signal 325 at appropriate/desired frequencies. This is particular advantage in FSK modulation applications where the frequency of the FSK modulated signal is not fixed, such as within Wireless Power Consortium WPC-QI applications.

Figure 7:
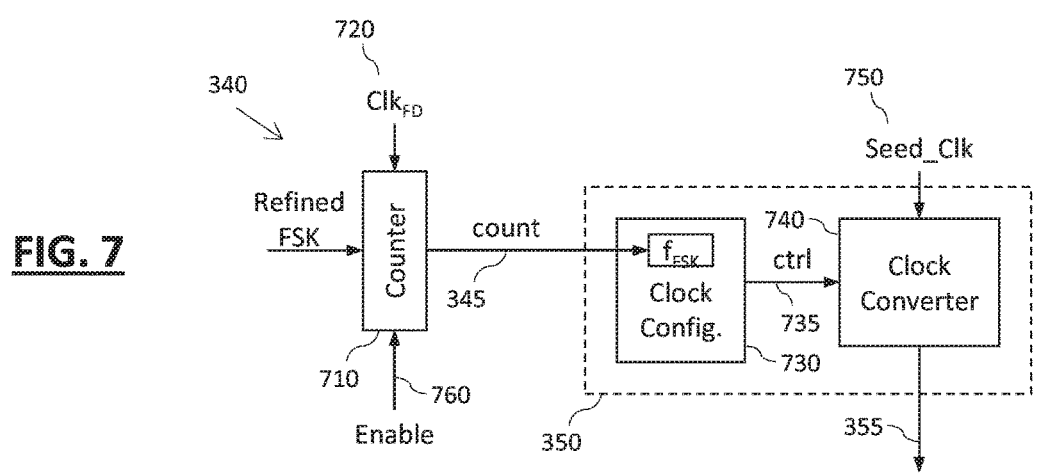
FIG. 7 is a simplified block diagram of an embodiment of the frequency detector and clock generator of the present invention.

FIG. 7 is a simplified block diagram of an embodiment of the frequency detector 340 and clock generator 350. In this embodiment, the frequency detector 340 comprises a counter 710. The counter 710 receives the refined FSK modulated signal 315 and a clock signal $Clk_{FD}$ 720, and is arranged to count the number of clock cycles of the clock signal $Clk_{FD}$ 720 within, for example, a single cycle of the FSK modulated signal 315, and to output the count value as the indication 345 of the modulation frequency $f_{FSK}$ of the refined FSK modulated signal 315 to the clock generator 350.

In the embodiment illustrated in FIG. 7, the clock generator 350 comprises a clock configuration component 730 that receives the indication 345 of the modulation frequency $f_{FSK}$ of the refined FSK modulated signal 315 output by the counter 710 of the frequency detector 340, and outputs a control signal 735 to a clock converter component 740. The clock converter component 740 receives the control signal 735 output by the clock configuration component 730 and a seed clock signal 750, and converts (e.g., by dividing and/or multiplying) the seed clock signal 750 into the sampling clock signal 355 based on the control signal 735 output by the clock configuration component 730. In some embodiments, the same clock signal may be used for both the clock signal $Clk_{FD}$ 720 and the seed clock signal 750.

As described above, in some embodiments the clock generator 350 may be arranged to configure the sampling clock signal 355 to cause the sampler 320 to sample the refined FSK modulated signal 315 at a frequency $f_s$ offset from the modulation frequency $f_{FSK}$ by a defined frequency offset ($f_{offset}$). Accordingly, if the sampler 320 is arranged to sample the refined FSK signal 315 once each cycle of the sampling clock signal 355 (e.g., on each rising or falling edge of the sampling clock signal 355), the clock configuration component 730 may be arranged to configure the control signal 735 to cause the clock converter 355 multiple/divide the seed clock 750 to generate a sampling clock signal 355 having a clock frequency equal to (or as close to as is practical to achieve) the detected modulation frequency $f_{FSK}$ plus the defined frequency offset ($f_{offset}$).

It will be appreciated that the present invention is not limited to the frequency detector 340 being implemented by way of a counter, and that any suitable alternative circuit arrangement for detecting the frequency of the FSK modulated signal 315 may equally be implemented. One example of such an alternative implementation of the frequency detector 340 comprises a timer circuit arranged to measure a number of cycles of the FSK modulated signal 315 that occur within a given time period.

It will further be appreciated that the present invention is not limited to the specific embodiment of the clock generator 350 illustrated in FIG. 7. For example, it is contemplated that the indication 345 of the detected modulation frequency $f_{FSK}$ output by the frequency detector 340 may be provided directly to the clock converter component 740. Additionally/alternatively, it is contemplated that the clock generator 350 may comprise, say, a phase-locked loop or other timing circuit arranged to generate the sampling clock signal 355, and controllable by the control signal 735 output by the clock configuration component 730, or directly by the indication 345 of the detected modulation frequency $f_{FSK}$ output by the frequency detector 340.

In the example illustrated in FIG. 7, the frequency detector 340 is further arranged to receive an enable signal 760. In this manner, the frequency detector 340 may be enabled to generate or update the indication 345 of the modulation frequency $f_{FSK}$ of the refined FSK modulated signal 315 during, for example, initialisation periods of the FSK modulated signal. The frequency detector 340 may then be disabled once the indication 345 of the modulation frequency $f_{FSK}$ of the refined FSK modulated signal 315 has been generated/updated to reduce power consumption.

Figure 8:
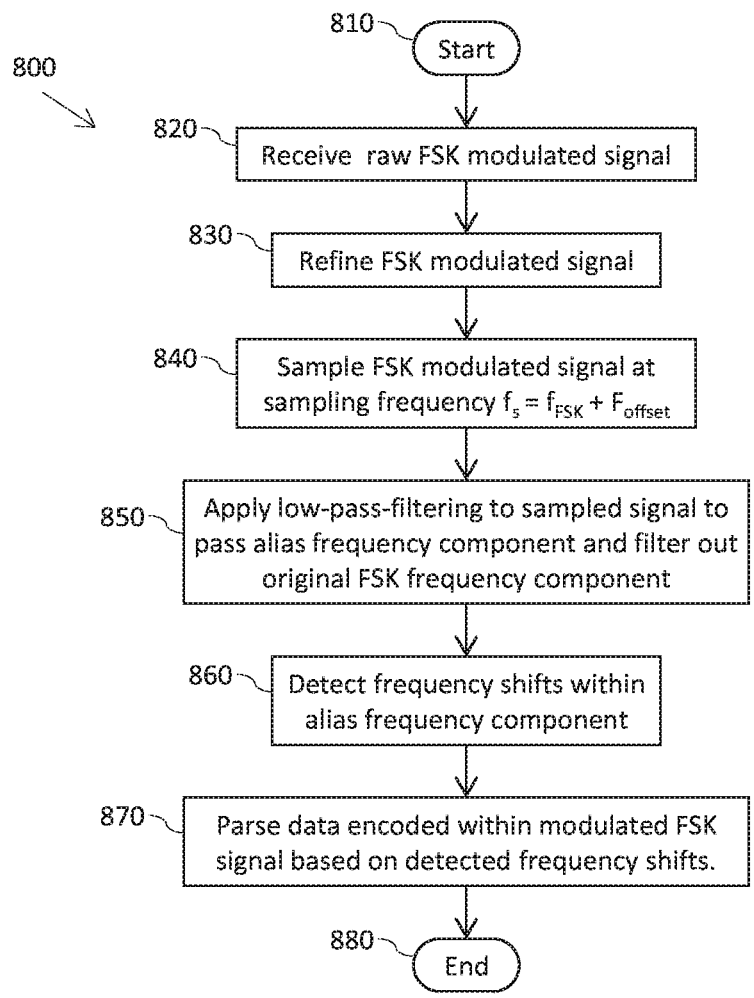
FIG. 8 is a simplified flow chart of a method of performing FSK demodulation in accordance with an embodiment of the present invention.

Referring now to FIG. 8, a simplified flow chart of an example of a method 800 of performing FSK demodulation, such as may be implemented by the FSK demodulator 300 illustrated in FIG. 3, is shown. The method starts at 810, and moves on to 820 where a raw FSK modulated signal is received. Next, at 830, the received FSK signal is refined, for example such as performed by the square wave generator 310 illustrated in FIG. 3, through a voltage divider circuit and/or a filter, etc. Next, at 840, the refined FSK modulated signal is sampled. In the illustrated example, the refined FSK modulated signal is sampled at a frequency $f_s$ offset from the modulation frequency $f_{FSK}$ by a defined frequency offset $f_{offset}$. Low pass filtering is then applied to the sampled signal at 850 to pass an alias frequency component of the sampled signal and filter out the original FSK frequency component of the sampled signal. Frequency shift detection is then performed on the low pass filtered signal to detect frequency shifts in the alias frequency component of the sampled signal, at 860. Data encoded within the modulated FSK signal is then parsed at 870 based on detected frequency shifts in the alias frequency component of the sampled signal. The method then ends at 880.

The description of the preferred embodiments of the present invention has been presented for purposes of illustration and description, but is not intended to be exhaustive or to limit the invention to the forms disclosed. It will be appreciated by those skilled in the art that changes could be made to the embodiments described above without departing from the broad inventive concept thereof. It is understood, therefore, that this invention is not limited to the particular embodiment disclosed, but covers modifications within the spirit and scope of the present invention as defined by the appended claims.

The invention claimed is:

1. A frequency shift keying (FSK) demodulator, comprising:
   a sampler that receives an FSK modulated signal, samples the received FSK modulated signal, and outputs the sampled signal, wherein the sampler samples the received FSK modulated signal at a rate defined by a sampling clock signal;
   a filter that low pass filters the sampled signal output by the sampler;
   a frequency shift detector that detects shifts in frequency of the low pass filtered sampled signal, and outputs an indication of the detection of shifts in frequency of the low pass filtered sampled signal;
   a frequency detector that receives the FSK modulated signal, detects the modulation frequency $f_{FSK}$ of the FSK modulated signal, and outputs an indication of the modulation frequency $f_{FSK}$; and
   a sampling clock generator that dynamically generates the sampling clock signal, wherein the clock generator receives the indication of a modulation frequency $f_{FSK}$ of the FSK modulated signal from the frequency detector, and configures the sampling clock signal to cause the sampler to sample the FSK modulated signal at a frequency $f_s$ offset from the modulation frequency $f_{FSK}$ by a defined frequency offset $f_{offset}$;
   wherein the frequency detector comprises a counter that receives the FSK modulated signal and a clock signal $Clk_{FD}$, and counts the number of clock cycles of the clock signal $Clk_{FD}$ within a single cycle of the FSK modulated signal, and outputs the count value as the indication of the modulation frequency $f_{FSK}$ of the refined FSK modulated signal to the sampling clock generator.

2. The FSK demodulator of claim 1, wherein the defined frequency offset $f_{offset}$ comprises a frequency within the frequency range passed by the filter.

3. The FSK demodulator of claim 1, further comprising a square wave generator that receives a raw FSK signal to be demodulated and converts the received raw FSK signal into a refined FSK modulated square wave signal, and wherein the FSK modulated signal received and sampled by the sampler comprises the refined FSK modulated square wave signal.

4. The FSK demodulator of claim 1, wherein the FSK demodulator demodulates an FSK modulated RF electrical signal output by a power pick-up unit of a receiver within a wireless power transfer system device.

5. The FSK demodulator of claim 4, wherein the wireless power transfer system device comprises a Wireless Power Consortium WPC-QI device.

6. An integrated circuit device comprising at least one frequency shift keying (FSK) demodulator component, the FSK demodulation component comprising:
   a sampler that receives an FSK modulated signal, samples the received FSK modulated signal at a rate defined by a sampling clock signal, and outputs a sampled signal;
   a low pass filter that filters the sampled signal output by the sampler;
   a frequency shift detector that detects shifts in frequency of the filtered sampled signal, and outputs an indication of the detection of shifts in frequency of the filtered sampled signal;
   a frequency detector that receives the FSK modulated signal, detects the modulation frequency $f_{FSK}$ of the FSK modulated signal, and outputs an indication of the modulation frequency $f_{FSK}$; and
   a clock generator for generating the sampling clock signal, wherein the clock generator receives an the indication of a modulation frequency $f_{FSK}$ of the FSK modulated signal from the frequency detector, and configures the sampling clock signal to cause the sampler to sample the FSK modulated signal at a frequency $f_s$ offset from the modulation frequency $f_{FSK}$ by a defined frequency offset $f_{offset}$;
   wherein the frequency detector comprises a counter that receives the FSK modulated signal and a clock signal $Clk_{FD}$, and counts the number of clock cycles of the clock signal $Clk_{FD}$ within a single cycle of the FSK modulated signal, and outputs the count value as the indication of the modulation frequency $f_{FSK}$ of the refined FSK modulated signal to the sampling clock generator.

7. The integrated circuit device of claim 6, wherein the defined frequency offset $f_{offset}$ comprises a frequency within the frequency range passed by the filter.

8. The integrated circuit device of claim 6, wherein the FSK demodulator component further comprises a square wave generator that receives a raw FSK signal to be demodulated and converts the received raw FSK signal into a refined FSK modulated square wave signal, and wherein the FSK modulated signal received and sampled by the sampler comprises the refined FSK modulated square wave signal.

9. The integrated circuit device of claim 6, wherein the FSK demodulator component demodulates an FSK modulated RF electrical signal output of a power pick-up unit of a receiver within a wireless power transfer system device.

10. The integrated circuit device of claim 9, wherein the wireless power transfer system device comprises a Wireless Power Consortium WPC-QI device.

\* \* \* \* \*